(12) United States Patent
Shin et al.

(10) Patent No.: US 8,018,540 B2
(45) Date of Patent: Sep. 13, 2011

(54) LIQUID CRYSTAL DISPLAY AND METHOD FOR MANUFACTURING THE SAME

(75) Inventors: Kyoung-Ju Shin, Hwaseong-si (KR); Chong-Chul Chai, Seoul (KR); Se-Young Song, Uigeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 460 days.

(21) Appl. No.: 12/351,524

(22) Filed: Jan. 9, 2009

(65) Prior Publication Data

US 2009/0256979 A1 Oct. 15, 2009

(30) Foreign Application Priority Data

Apr. 14, 2008 (KR) .................. 10-2008-0034286

(51) Int. Cl.
*G02F 1/1368* (2006.01)
*G02F 1/1335* (2006.01)
(52) U.S. Cl. ............ 349/38; 349/43; 349/106; 349/110; 349/156; 349/162
(58) Field of Classification Search .................. 349/38, 349/42, 43, 106, 155, 156, 162, 187; 257/59, 257/72; 438/30; 345/88, 92
See application file for complete search history.

(56) References Cited

U.S. PATENT DOCUMENTS

| 2004/0005739 | A1* | 1/2004 | Furusawa .................. 438/149 |
| 2004/0119903 | A1* | 6/2004 | Chang et al. ................ 349/43 |
| 2007/0177072 | A1* | 8/2007 | Chang ......................... 349/110 |

* cited by examiner

*Primary Examiner* — David Nelms
*Assistant Examiner* — Tai Duong
(74) *Attorney, Agent, or Firm* — H.C. Park & Associates, PLC

(57) ABSTRACT

The present invention relates to a liquid crystal display and a manufacturing method thereof. The liquid crystal display includes a first substrate, a plurality of gate lines and data lines disposed on the first substrate and crossing each other to define a plurality of pixels, a plurality of thin film transistors connected to the gate lines and the data lines, a plurality of color filters disposed on the thin film transistors, a partition to divide the color filters, a plurality of pixel electrodes connected to the thin film transistors, a second substrate facing the first substrate, a common electrode disposed on the second substrate, the common electrode forming a liquid crystal capacitor and a storage capacitor along with the pixel electrode, and a liquid crystal layer disposed between the first substrate and the second substrate. Each pixel includes a display region where the pixel electrode and the color filter overlap each other, and a storage region where the pixel electrode and the common electrode form the storage capacitor, and the thin film transistor and the pixel electrode are connected to each other in the storage region.

24 Claims, 10 Drawing Sheets

LIQUID CRYSTAL DISPLAY AND METHOD FOR MANUFACTURING THE SAME

CROSS-REFERENCE TO RELATED APPLICATION

This application claims priority from and the benefit of Korean Patent Application No. 10-2008-0034286, filed on Apr. 14, 2008, which is hereby incorporated by reference for all purposes as if fully set forth herein.

BACKGROUND OF THE INVENTION

1. Field of the Invention

The present invention relates to a liquid crystal display and a manufacturing method thereof.

2. Discussion of the Background

A liquid crystal display (LCD) is one of the most commonly used flat panel displays, and it includes two substrates with electrodes formed thereon and a liquid crystal layer disposed between the two substrates. In the LCD, a voltage is applied to the electrodes to alter the alignment of the liquid crystal molecules of the liquid crystal layer, thereby regulating the transmittance of light passing through the liquid crystal layer.

An LCD having a structure in which field generating electrodes are respectively formed on two display panels is widely used. Among the two display panels, a plurality of pixel electrodes are arranged in a matrix format on one display panel (hereinafter referred to as a "thin film transistor array panel") and one common electrode covers the entire surface of the other display panel (hereinafter referred to as a "common electrode panel").

However, in this LCD, the pixel electrodes and the color filters are disposed on different display panels such that it may be difficult to align the pixel electrodes and the color filters with each other, thereby causing an alignment error.

To solve this problem, a color filter on array (CoA) structure in which the pixel electrode and the color filter are formed on the same display panel is provided.

In the CoA structure, the color filter may be formed using an inkjet printing method. In the inkjet printing method, liquid ink is jetted to realize color images, and a plurality of color filters including a red filter, a green filter, and a blue filter may be formed simultaneously such that the time and cost of the manufacturing process may be significantly reduced.

When forming the color filters by the inkjet printing method, a partition to divide the liquid ink may be required. This partition may be formed to prevent the liquid ink from flowing to undesired regions. For example, partitions may be formed at a contact hole and at a storage capacitor as well as at a portion to divide the color filters, but the area that the partition occupies may be increased in this case such that the aperture ratio may be greatly deteriorated.

SUMMARY OF THE INVENTION

The present invention provides a liquid crystal display having an improved aperture ratio.

The present invention also provides a method of manufacturing the liquid crystal display.

Additional features of the invention will be set forth in the description which follows, and in part will be apparent from the description, or may be learned by practice of the invention.

The present invention discloses a liquid crystal display including a first substrate, a plurality of gate lines and data lines disposed on the first substrate and crossing each other to define a plurality of pixels, a plurality of thin film transistors connected to the gate lines and the data lines, a plurality of color filters disposed on the thin film transistors, a partition dividing the color filters, a plurality of pixel electrodes connected to the thin film transistors, a second substrate facing the first substrate, a common electrode disposed on the second substrate, and a liquid crystal layer disposed between the first substrate and the second substrate. The common electrode forms a liquid crystal capacitor and a storage capacitor along with the pixel electrode. Each pixel includes a display region where the pixel electrode and the color filter overlap each other and a storage region where the pixel electrode and the common electrode form the storage capacitor, and the thin film transistor and the pixel electrode are connected to each other in the storage region.

The storage region may be disposed on the partition.

The liquid crystal display may further include an alignment layer formed on at least one of the pixel electrode and the common electrode, wherein the pixel electrode and the common electrode form the storage capacitor via the alignment layer as an insulator.

The alignment layer may be formed on at least one of the pixel electrode and the common electrode, and the pixel electrode and the alignment layer, and the alignment layer and the common electrode may contact each other.

The alignment layer may include a first alignment layer formed on the pixel electrode and a second alignment layer formed on the common electrode, and the first alignment layer and the second alignment layer may contact each other.

The partition may include a first partition extending according to the data line and a second partition protruded from the first partition and being thicker than the first partition, and the storage region may be formed on the second partition.

The liquid crystal layer of the display region may be thicker than the liquid crystal layer disposed on the first partition and the second partition.

The thickness of the liquid crystal layer of the display region may be in the range of 3 to 6 μm, the thickness of the liquid crystal layer on the first partition may be in the range of 0.5 to 2.5 μm, and the thickness of the liquid crystal layer on the second partition may be less than 0.3 μm.

The liquid crystal layer may not be formed on the second partition.

The partition may be a spacer.

The partition may be a light blocking member.

The liquid crystal display may further include a light blocking member formed on the thin film transistors. The present invention also discloses a liquid crystal display including a first substrate, a gate line disposed on the first substrate and including a gate electrode, a gate insulating layer disposed on the gate line, a partition disposed on the gate insulating layer, a semiconductor disposed on the gate insulating layer and overlapping the gate electrode, a data line disposed on the semiconductor, the data line including a source electrode and overlapping the partition, a drain electrode facing the source electrode on the semiconductor and extending on the partition, a color filter disposed in the region defined by the partition, a pixel electrode connected to the drain electrode on the partition; a second substrate facing the first substrate; a common electrode formed on the second substrate, an alignment layer disposed on at least one of the pixel electrode and the common electrode, and a liquid crystal layer disposed between the first substrate and the second substrate.

The pixel electrode and the common electrode may form a storage capacitor via the alignment layer as an insulator on the partition.

The alignment layer may be formed on one of the pixel electrode and the common electrode, and the pixel electrode and the alignment layer, and the alignment layer and the common electrode contact each other.

The alignment layer may be formed on one of the pixel electrode and the common electrode, and the pixel electrode and the alignment layer, or the common electrode and the alignment layer may be separated from each other by a distance of 0.1 to 0.3 μm.

The alignment layer includes a first alignment layer formed on the pixel electrode and a second alignment layer formed on the common electrode, and the first alignment layer and the second alignment layer contact each other.

The alignment layer includes a first alignment layer formed on the pixel electrode and a second alignment layer formed on the common electrode, and the first alignment layer and the second alignment layer are separated from by a distance of 0.1 to 0.3 μm.

The liquid crystal display may include a first pixel, a second pixel, and a third pixel for display the different colors, and the partition may include a first partition overlapping the data line and disposed between the first and second and the third pixels, and a second partition formed in one of the first pixel, the second pixel, and the third pixel, and being thicker than the first partition.

The partition may be a light blocking member.

The present invention also discloses a method of manufacturing a liquid crystal display including forming a gate electrode on a first substrate, forming a gate insulating layer on the gate electrode, forming a partition on the gate insulating layer, forming a semiconductor on the partition, forming a source electrode and a drain electrode on the semiconductor, forming a color filter in a region defined by the partition, forming a pixel electrode connected to the drain electrode on the partition, forming a common electrode on a second substrate, and assembling the first substrate with the second substrate.

The forming of the partition includes forming a first partition and a second partition having different thicknesses.

The forming of the color filter may be executed by an Inkjet printing method.

The manufacturing method may further include forming an insulating layer before or after the forming of the color filter, and forming a contact hole in the insulating layer on the partition before the forming of the pixel electrode. It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Now, a liquid crystal display according to an exemplary embodiment of the present invention will be described in detail with the reference to FIG. 1 and FIG. 2.

Figure 1:
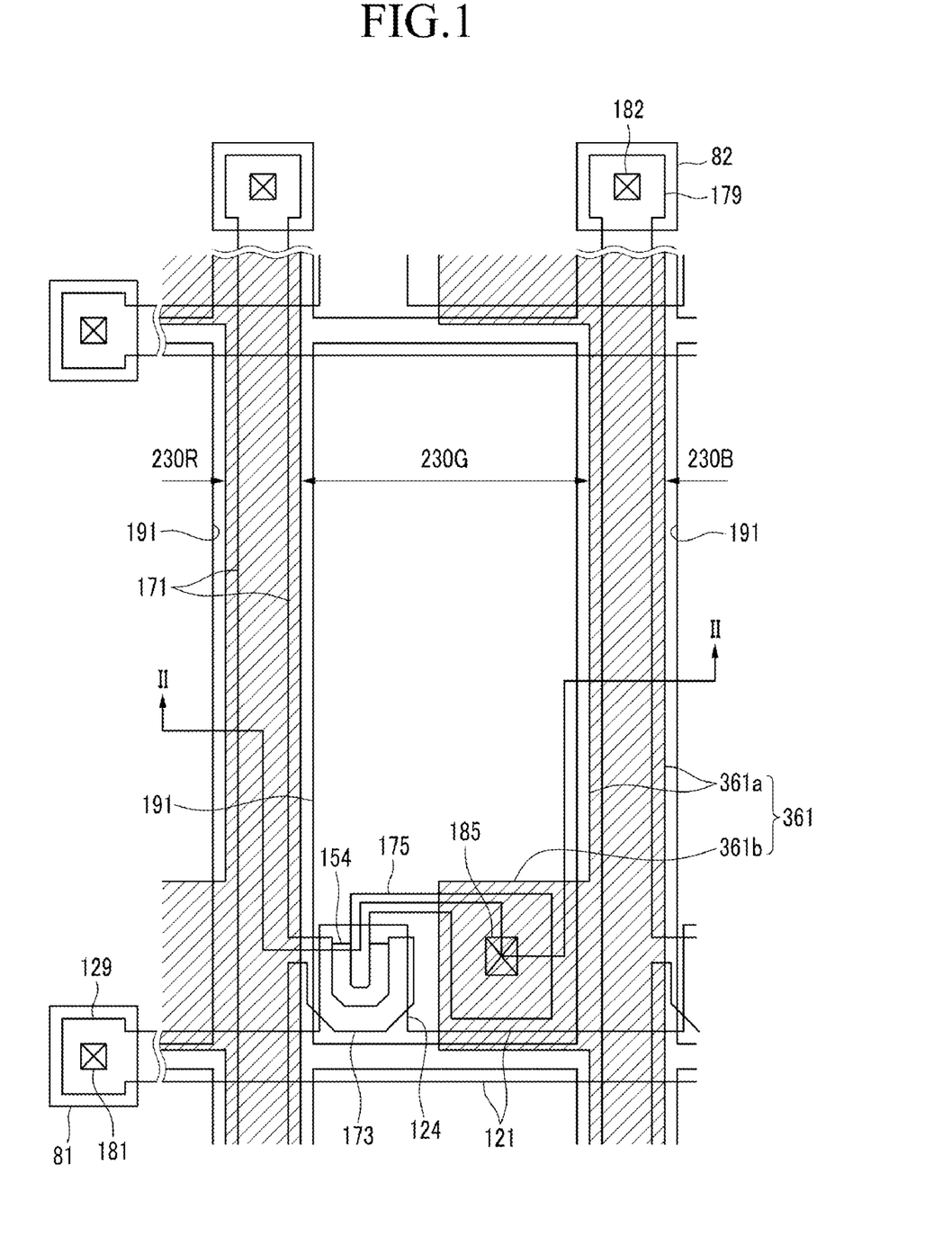
FIG. 1 is a layout view of a liquid crystal display according to an exemplary embodiment of the present invention.
Figure 2:
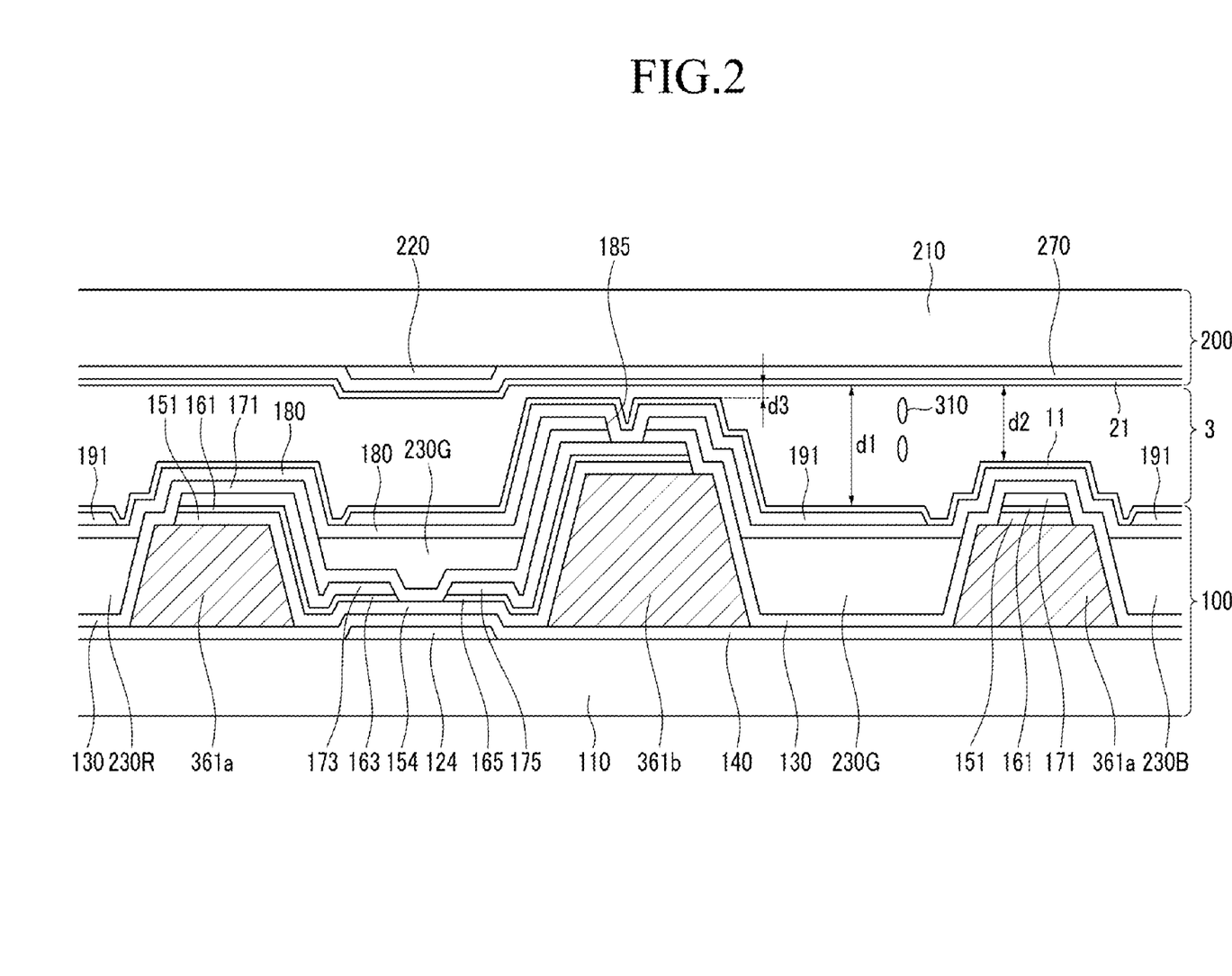
FIG. 2 is a cross-sectional view of the liquid crystal display shown in FIG. 1 taken along line II-II.

FIG. 1 is a layout view of a liquid crystal display according to an exemplary embodiment of the present invention, and FIG. 2 is a cross-sectional view of the liquid crystal display shown in FIG. 1 taken along line II-II.

Referring to FIG. 1 and FIG. 2, the liquid crystal display according to an exemplary embodiment of the present invention includes a thin film transistor array panel 100 and a common electrode panel 200 facing each other, and a liquid crystal layer 3 disposed therebetween.

First, the thin film transistor array panel 100 will be described.

A plurality of gate lines 121 to transmit gate signals are formed on an insulating substrate 110. Each gate line 121 includes a plurality of gate electrodes 124 extending upward and an end portion 129 having a wide width for the connection to an external circuit.

A gate insulating layer 140, which may be made of silicon nitride ($SiN_x$) or silicon oxide ($SiO_x$), is formed on the gate lines 121.

A partition 361 is formed on the gate insulating layer 140. The partition 361 may include a light blocking insulating material to absorb light.

The partition 361 includes a first partition 361a extending in a vertical direction and a second partition 361b extending from a side of the first partition 361a.

The first partition 361a extends in the vertical direction and divides color filters 230R, 230G, and 230B, which will be described below.

The second partition 361b may be thicker than the first partition 361a.

The partition 361 may function as a column spacer, and if so, the second partition 361b may be a main spacer and the first partition 361a may be a sub-spacer.

A plurality of semiconductor stripes 151, which may be made of amorphous or crystallized silicon, are formed on the gate insulating layer 140 and the partition 361. The semiconductor stripes 151 extend according to the first partition 361a, and include a plurality of protrusions 154 extending toward the gate electrode 124.

A plurality of ohmic contact stripes 161 and ohmic contact islands 165, which may be made of a material such as n+ hydrogenated amorphous silicon in which an n-type impurity such as phosphor is doped with high density, or silicide, are formed on the semiconductor stripes 151. The ohmic contact stripes 161 include a plurality of protrusions 163 extending toward the protrusions 154 of the semiconductor stripes 151, and the protrusions 163 and the ohmic contact islands 165 are disposed as pairs on the protrusions 154 of the semiconductor stripes 151.

A plurality of data lines 171 and a plurality of drain electrodes 175 are formed on the ohmic contact stripes 161, the ohmic contact islands 165, and the gate insulating layer 140.

The data lines 171 transfer data signals and extend mainly in a longitudinal direction, thereby crossing the gate lines 121. The data lines 171 overlap the first partition 361a and have a narrower width than that of the first partition 361a. Each data line 171 includes a plurality of source electrodes 173 extending toward the drain electrodes 175.

Each drain electrodes 175 include a bar portion enclosed by the source electrode 173 and a wide portion curved from the bar portion. The wide portion of the drain electrode 175 overlaps the second partition 361b.

One gate electrode 124, one source electrode 173, and one drain electrode 175 form a thin film transistor (TFT) together with the protrusion of the semiconductor stripe 151, and a channel of the TFT is formed to correspond to the protrusion 154 of the semiconductor stripe 151 between the source electrode 173 and the drain electrode 175.

The semiconductor stripes 151, except for the channel region between the source electrode 173 and the drain electrode 175, may have substantially the same plane shape as the data lines 171 and the drain electrodes 175.

The ohmic contact stripes 161 are disposed between the semiconductor stripes 151 and the data lines 171, and may have substantially the same plane shape as the data lines 171. The ohmic contact islands 165 are disposed between the semiconductor stripes 151 and the drain electrodes 175, and may have substantially the same plane shape as the drain electrodes 175.

The semiconductor stripes 151, the ohmic contact stripes 161, and the data lines 171 overlap the first partition 361a, and the semiconductor stripes 151, the ohmic contact islands 165, and the drain electrodes 175 overlap the second partition 361b.

A blocking layer 130, which may be made of silicon nitride or silicon oxide, is formed on the data lines 171 and the drain electrodes 175. The blocking layer 130 may prevent the color filters 230R, 230G, and 230B from flowing onto the exposed protrusions 154 of the semiconductor stripes 151 between the source electrodes 173 and the drain electrodes 175.

The color filters 230R, 230G, and 230B are formed on the blocking layer 130.

The color filters 230R, 230G, and 230B include a red filter 230R, a green filter 230G, and a blue filter 230B, which are formed in regions defined by the partition 361, and the red filter 230R, the green filter 230G, and the blue filter 230B may each have a stripe shape corresponding to the data line 171.

The passivation layer 180 is formed on the color filters 230R, 230G, and 230B. The passivation layer 180 may be made of an inorganic insulating material such as silicon nitride or silicon oxide, may prevent the color filters 230R, 230G, and 230B from lifting, and may prevent a chemical solution such as an etchant from flowing onto the color filters 230R, 230G, and 230B.

The passivation layer 180 and the blocking layer 130 include a contact hole 185 exposing the drain electrode 175. The contact hole 185 is disposed on the second partition 361b and exposes the wide portion of the drain electrode 175.

Also, the passivation layer 180 and the blocking layer 130 have a plurality of contact holes 182 exposing the end portions 179 of the data lines 171, and the passivation layer 180, the blocking layer 130, and the gate insulating layer 140 have a plurality of contact holes 181 exposing the end portions 129 of the gate lines 121.

A plurality of pixel electrodes 191 and a plurality of contact assistants 81 and 82 are formed on the passivation layer 180.

The pixel electrodes 191 are connected to the drain electrodes 175 through the contact holes 185 on the second partition 361b.

In the exemplary embodiment of the present invention, the connection of the drain electrode 175 and the pixel electrode 191 is formed on the second partition 361b. In this case, it may be unnecessary to also form the partition 361 on the circumference of the contact hole 185 to prevent the solution for the color filter from flowing into the contact hole 185. Therefore, the size of the region for the partition 361 may be reduced, which may prevent deterioration of the aperture ratio.

The contact assistants 81 and 82 are connected with the end portion 129 of the gate line 121 and the end portion 179 of the data line 171 via the contact holes 181 and 182, respectively. The contact assistants 81 and 82 complement adhesion of the end portion 129 of the gate line 121 and the end portion 179 of the data line 171 with an external device, and protect them.

The common electrode panel 200 facing the thin film transistor array panel 100 will now be described.

A plurality of light blocking members 220 are formed on an insulating substrate 210. The light blocking members 220 are disposed at positions corresponding to the thin film transistor of the thin film transistor array panel 100 to prevent external light from flowing to the thin film transistor.

A common electrode 270 is formed on the light blocking member 220 and the insulating substrate 210.

Alignment layers 11 and 21 are formed on the inner surfaces of the thin film transistor array panel 100 and the common electrode panel 200, respectively.

A liquid crystal layer 3 including a plurality of liquid crystal molecules 310 is disposed between the thin film transistor array panel 100 and the common electrode panel 200. The alignment of the liquid crystal molecules 310 of the liquid crystal layer 3 may be adjusted by an electric field generated between the common electrode 270 and the pixel electrode 191, which forms a liquid crystal capacitor.

In an exemplary embodiment of the present invention, the thickness of the liquid crystal layer 3, that is, the cell gap, may be different in different regions. In detail, the cell gap d1 of the display region where the color filters 230R, 230G, and 230B and the pixel electrodes 191 overlap each other is in the range of about 3 to 6 μm, the cell gap d2 on the first partition 361a is in the range of about 0.5 to 2.5 μm, and the cell gap d3 of the pixel contact region on the second partition 361b does not exist or may be less than about 0.3 μm.

Here, the pixel electrode 191 disposed on the second partition 361a is close to the common electrode 270 due to the thickness of the second partition 361a. In FIG. 2, the thin film transistor array panel 100 is spaced apart from the common electrode panel 200 by the interval d3 on the second partition 361a, but the alignment layers 11 and 21 may contact each other such that the interval d3 may not exist.

In this case, the pixel electrode 191 may form a storage capacitor along with the common electrode 270 via the alignment layers 11 and 21 as an insulator on the second partition 361a. The storage capacitor serves as an auxiliary to the liquid crystal capacitor to enhance the voltage storage capacity of the liquid crystal capacitor.

In an exemplary embodiment of the present invention, the connection of the thin film transistor and the pixel electrode 191 is in a storage region where a storage capacitor is formed between the pixel electrode 191 and the common electrode 270. Accordingly, it may be unnecessary to form an additional storage capacitor in the display region. Therefore, deterioration of the aperture ratio due to the presence of a storage capacitor may be prevented. Also, because it may be unnecessary to form the storage capacitor in the display region, it may be unnecessary to form the partition 361 to prevent the color filter from flowing into the portion for the storage capacitor. Accordingly, deterioration of the aperture ratio due to an increase in of the area of the partition may be prevented.

Also, because the connection of the pixel electrode 191 and the thin film transistor is formed in the storage region, the aperture ratio may be increased.

Next, a manufacturing method of the liquid crystal display shown in FIG. 1 and FIG. 2 will be described with the reference to FIG. 3, FIG. 4, FIG. 5, FIG. 6, FIG. 7, and FIG. 8 as well as FIG. 1 and FIG. 2.

FIG. 3, FIG. 4, FIG. 5, FIG. 6, FIG. 7, and FIG. 8 are cross-sectional views sequentially showing the manufacturing method of the liquid crystal display shown in FIG. 1 and FIG. 2.

Figure 3:
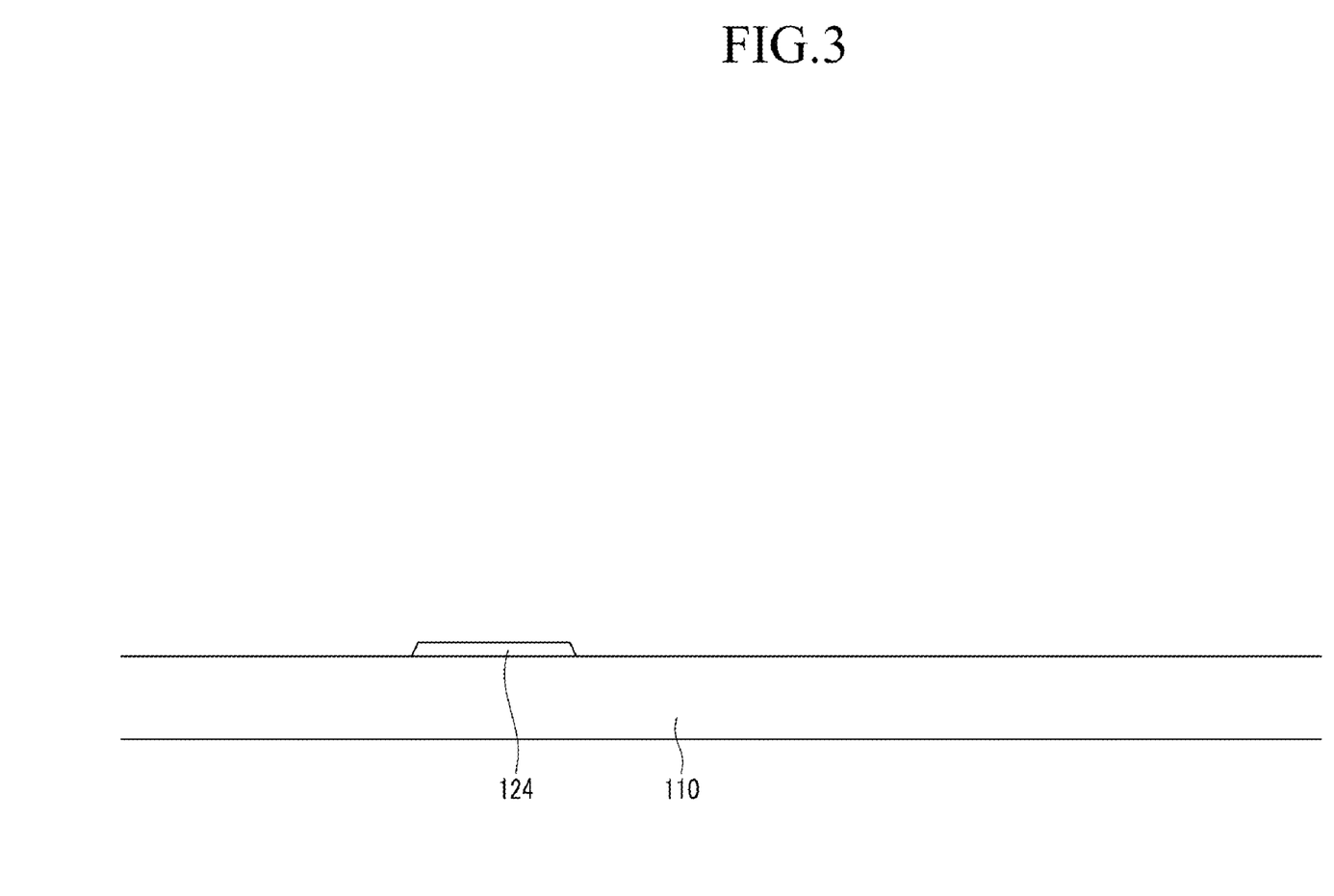
FIG. 3, FIG. 4, FIG. 5, FIG. 6, FIG. 7, and FIG. 8 are cross-sectional views sequentially showing a method of manufacturing the liquid crystal display shown in FIG. 1 and FIG. 2.

A manufacturing method of a thin film transistor array panel 100 will be described.

Referring to FIG. 3, a gate line 121 (see FIG. 1) including a gate electrode 124 and an end portion 129 (see FIG. 1) is formed on an insulating substrate 110.

Figure 4:
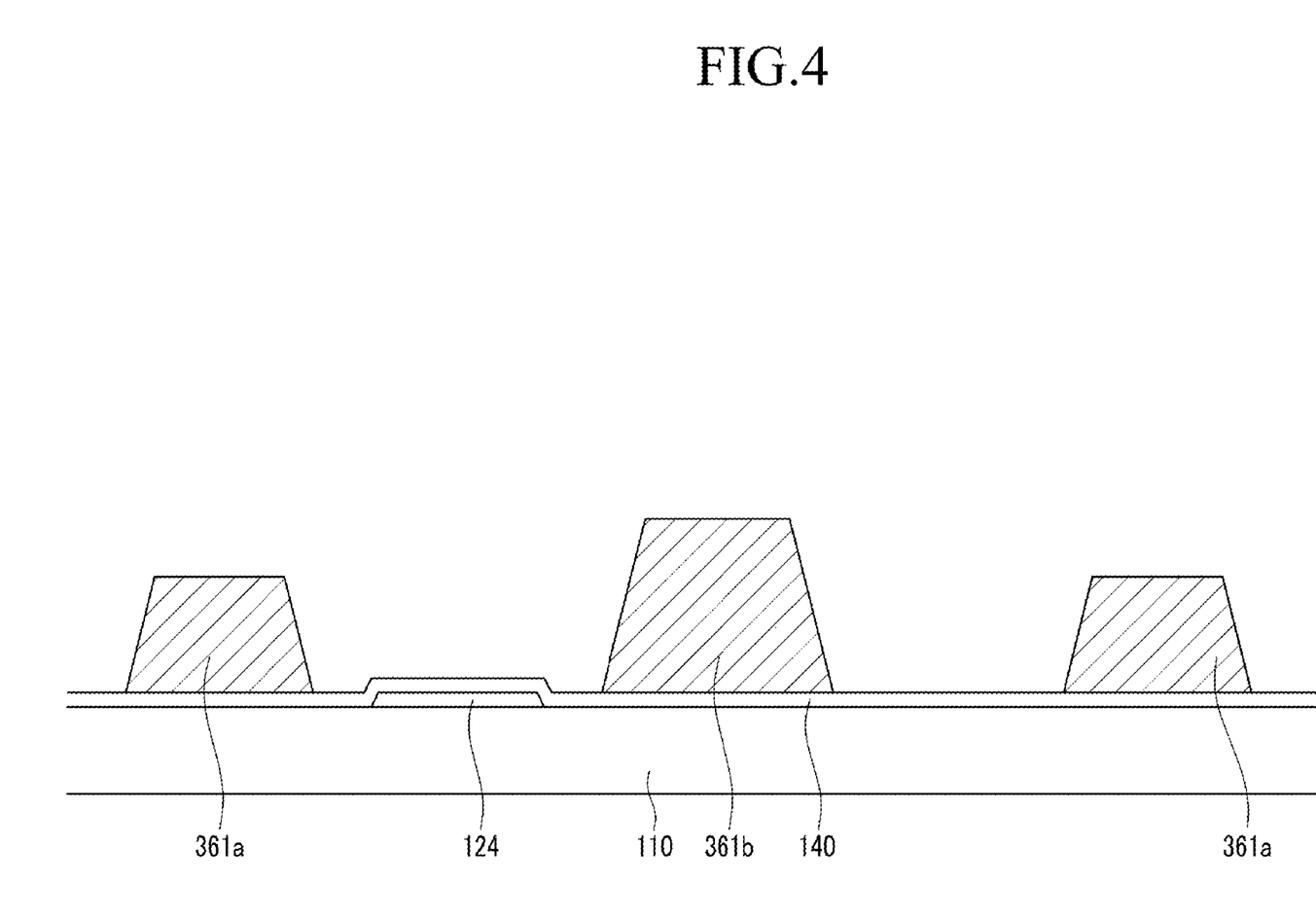

Referring to FIG. 4, a gate insulating layer 140 is formed on the whole surface of the insulating substrate 110 including the gate line 121 (see FIG. 1).

Next, a photosensitive material of a black color is thickly coated on the gate insulating layer 140. The photosensitive material is then exposed and developed using a slit mask to form a partition 361 including a first partition 361a and a second partition 361b having different thicknesses.

Figure 5:
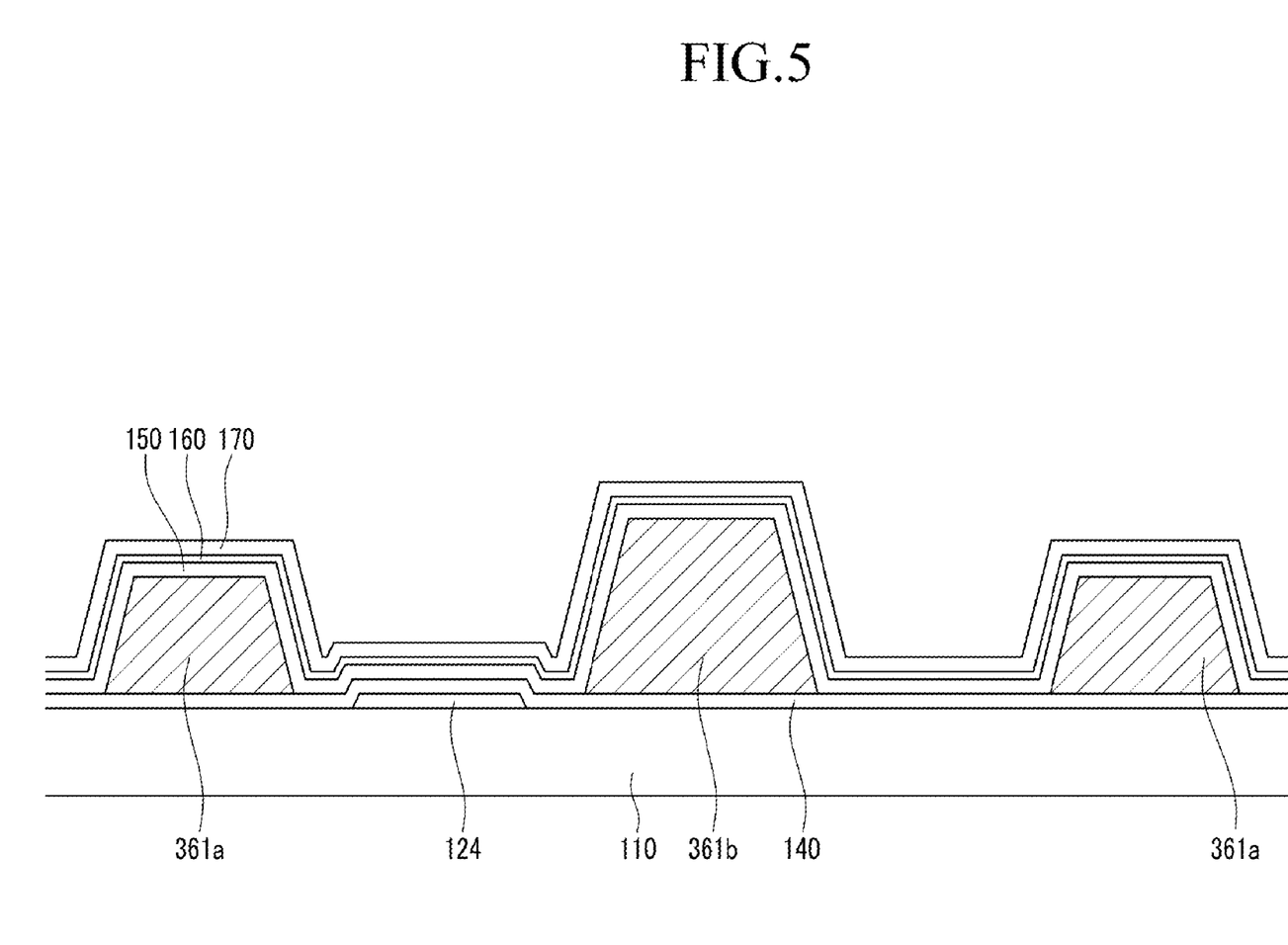

Referring to FIG. 5, a semiconductor layer 150, an ohmic contact layer 160, and a data conductive layer 170 are sequentially deposited on the gate insulating layer 140 and the partition 361.

Figure 6:
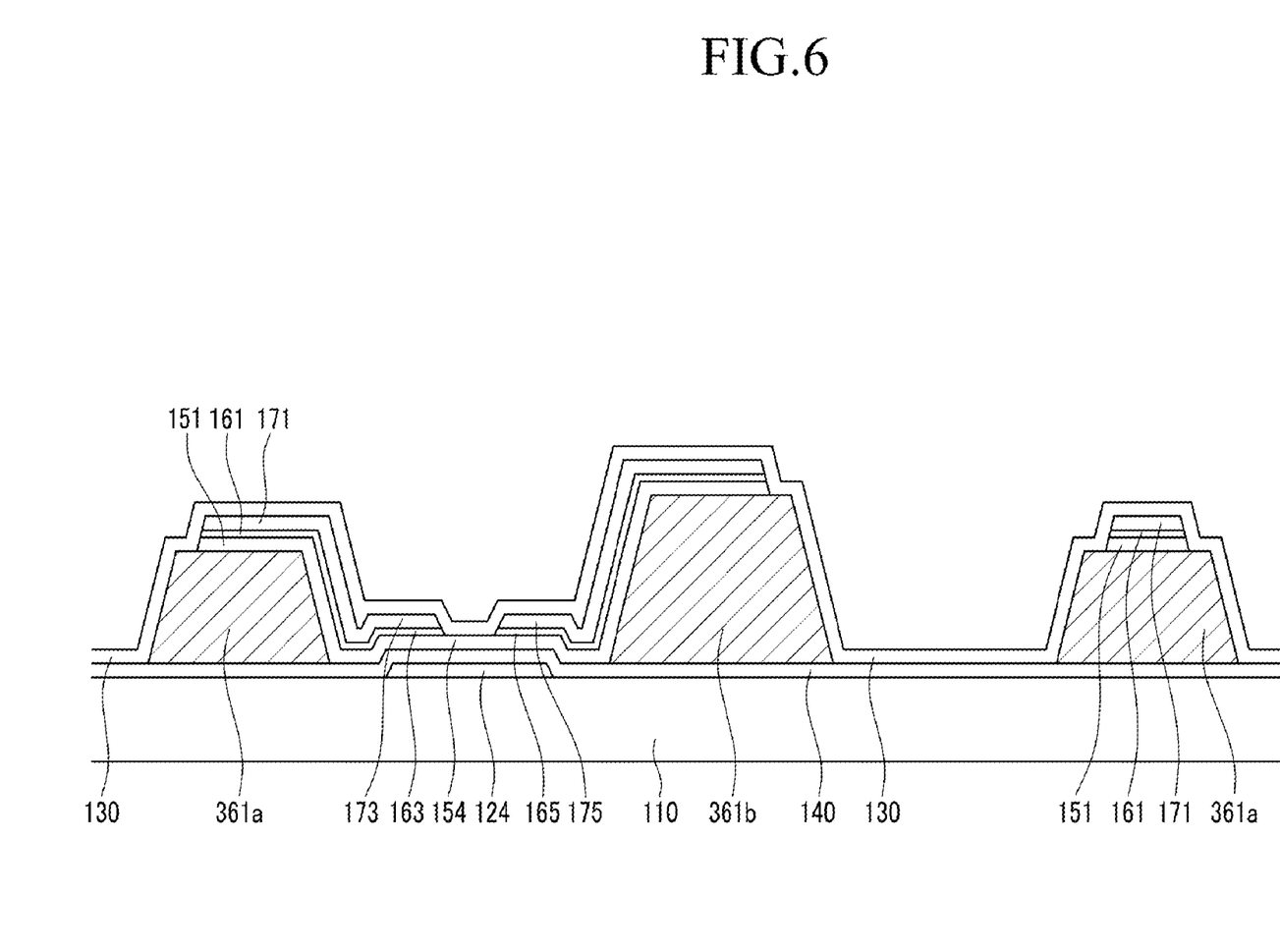

Referring to FIG. 5 and FIG. 6, a photosensitive film (not shown) is coated on the data conductive layer 170 and patterned using a slit mask to form a photoresist pattern having the different thicknesses. Next, the data conductive layer 170, the ohmic contact layer 160, and the semiconductor layer 150 are etched using the photoresist pattern as a mask, and the data conductive layer 170 is etched to form a data line 171 including a source electrode 173 and a drain electrode 175. The ohmic contact layer 160 that is exposed between the source electrode 173 and the drain electrode 175 is then removed to form an ohmic contact stripe 161 including a protrusion 163, and an ohmic contact island 165.

Then, a blocking layer 130 is formed on the whole surface including the data line 171, the drain electrode 175, and the gate insulating layer 140. The blocking layer 130 may be formed of silicon nitride or silicon oxide by a chemical vapor deposition method.

Figure 7:
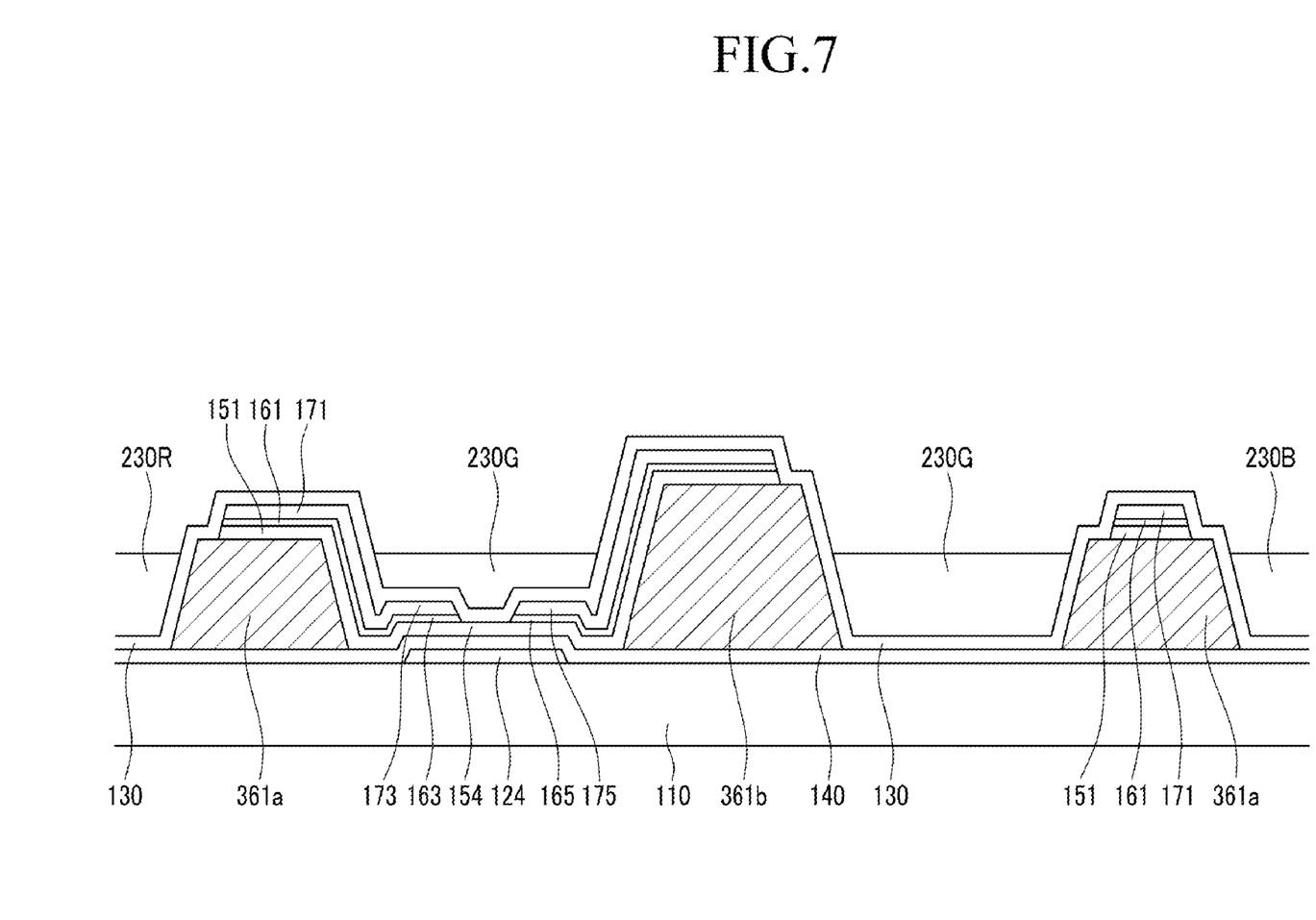

Referring to FIG. 7, color filters 230R, 230G, and 230B are formed in respective regions defined by the partition 361. The color filters 230R, 230G, and 230B may be formed by an inkjet printing method, and the head of an inkjet printing apparatus is moved to a region defined by the partition 361 and a solution for the color filter may be dripped in the region defined by the partition 361 through the inkjet printing method. Next, the solution for the color filters is dried.

Figure 8:
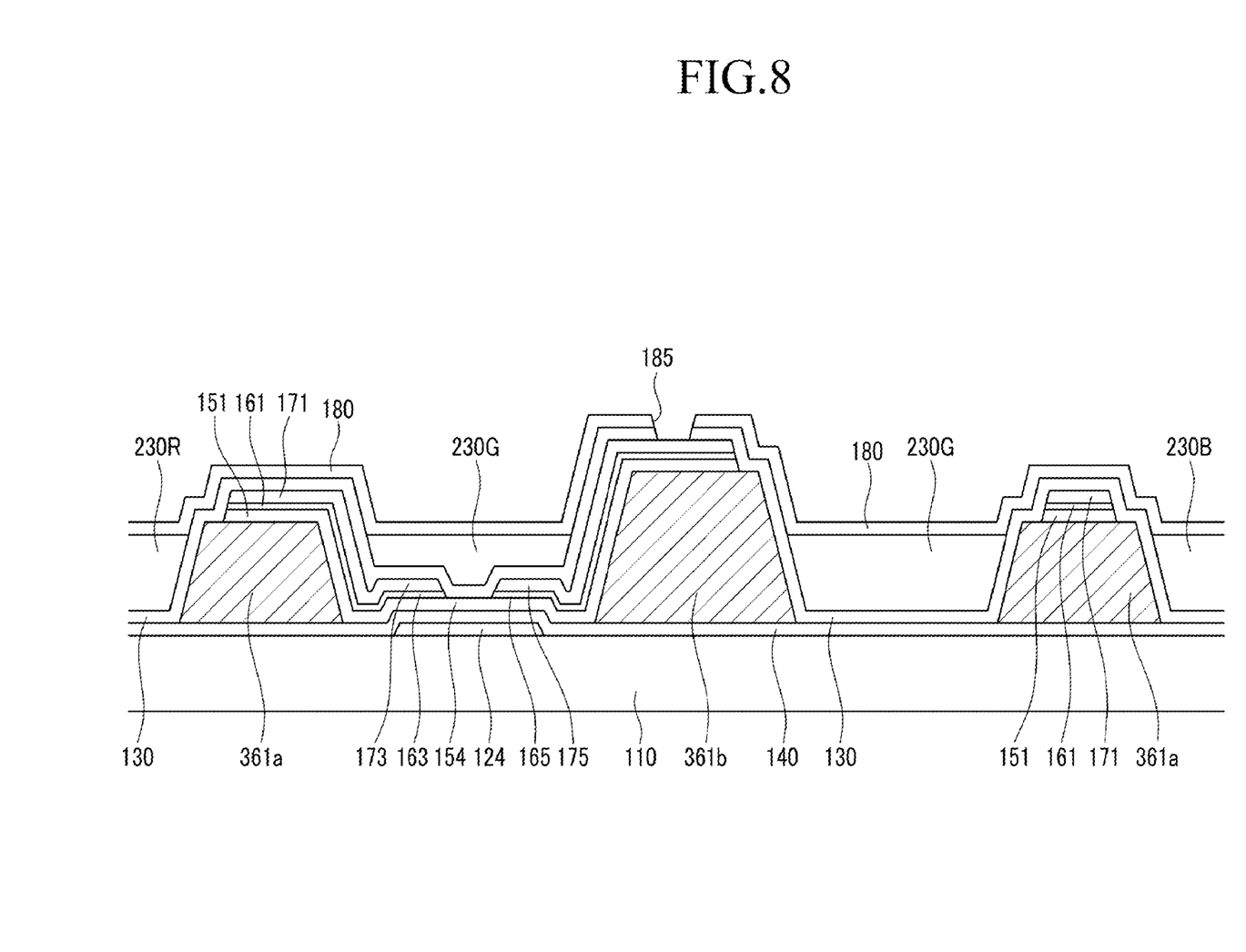

Referring to FIG. 8, a passivation layer 180 is formed on the color filters 230R, 230G, and 230B, and on the partition 361. The passivation layer 180 may be formed of silicon nitride or silicon oxide by a chemical vapor deposition method.

A contact hole 185 exposing the drain electrode 175 is then formed in the blocking layer 130 and the passivation layer 180 on the second partition 361b. Further, a contact hole 182 exposing the end portion 179 of the data line 171 is formed in the blocking layer 180 and the blocking layer 130, and a contact hole 181 exposing the end portion 129 of the gate line 121 is formed in the blocking layer 180, the blocking layer 130, and the gate insulating layer 140.

Next, referring to FIG. 2, a pixel electrode 191 is formed on the passivation layer 180, and an alignment layer 11 is coated thereon.

To form a common electrode panel 200, a plurality of light blocking members 220 are formed on an insulating substrate 210, and a common electrode 270 is formed thereon. An alignment layer 21 is then coated on the whole surface of the common electrode 270.

Next, liquid crystal molecules 310 are dripped onto one of the thin film transistor array panel 100 and the common electrode panel 200, and then the two display panels 100 and 200 are assembled together.

Exemplary Embodiment 2

Another exemplary embodiment of the present invention will now be described in detail with reference to FIG. 9 and FIG. 10.

Figure 9:
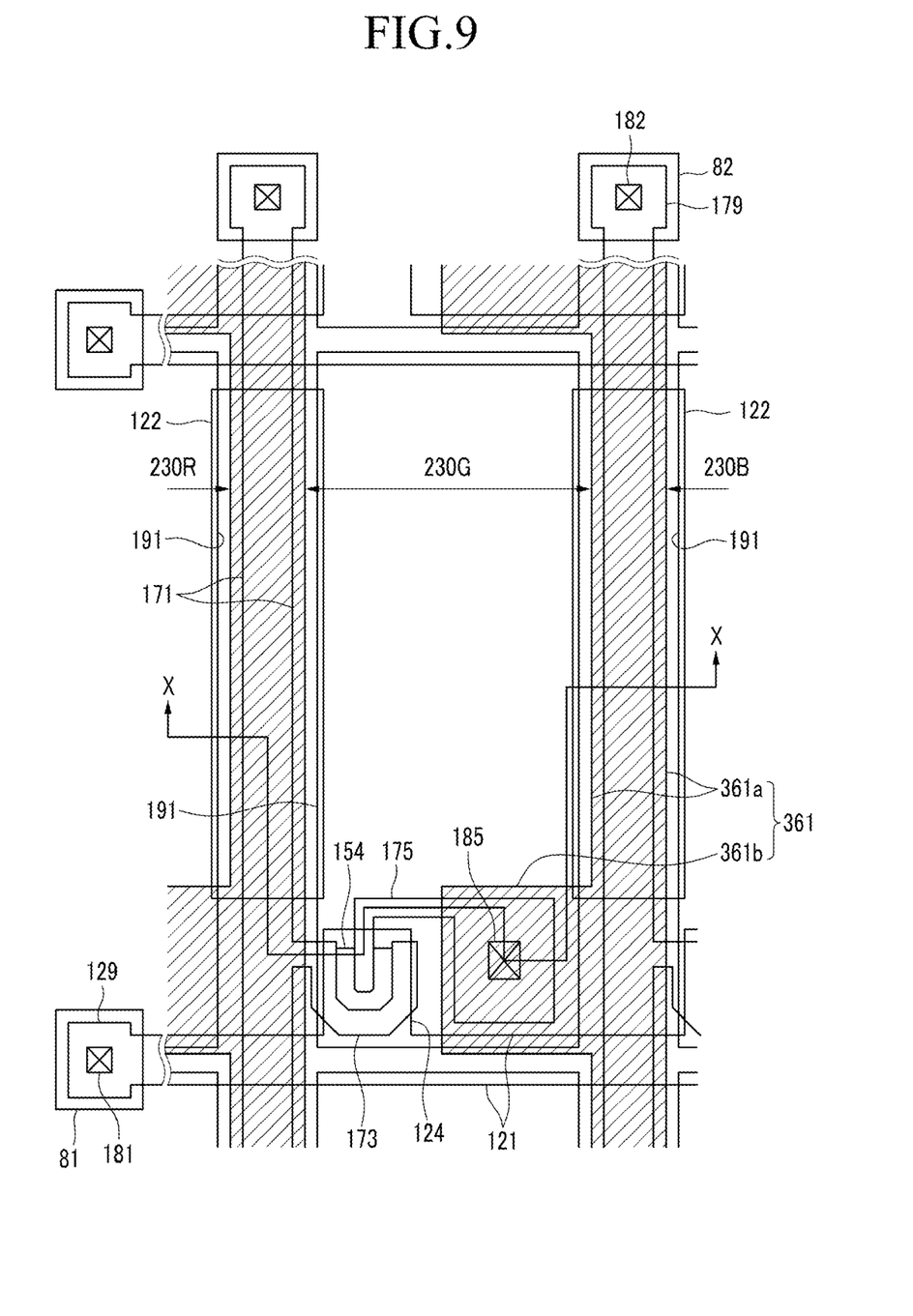
FIG. 9 is a layout view of a liquid crystal display according to another exemplary embodiment of the present invention.
Figure 10:
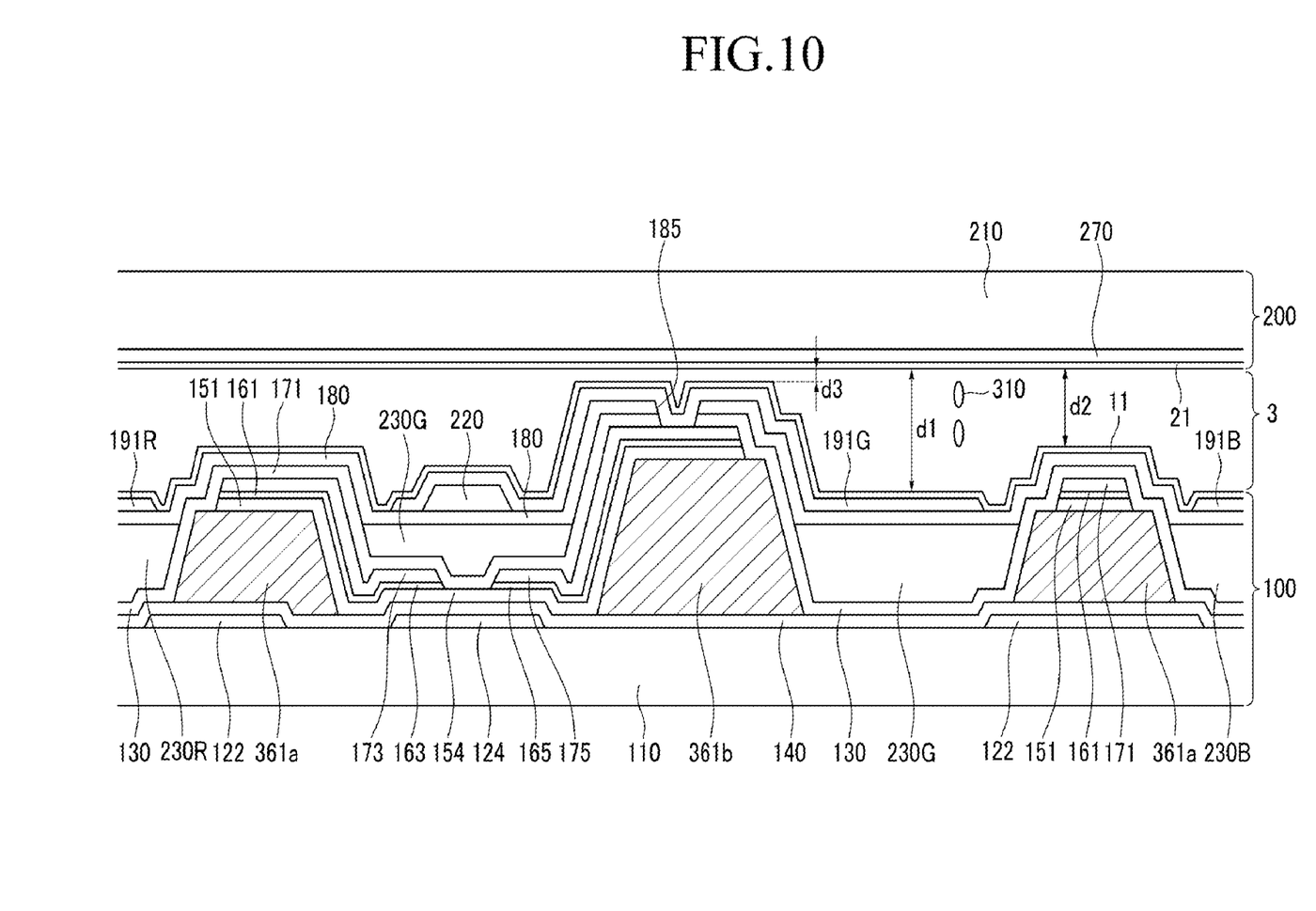
FIG. 10 is a cross-sectional view of the liquid crystal display shown in FIG. 9 taken along line X-X.

FIG. 9 is a layout view of a liquid crystal display according to another exemplary embodiment of the present invention, and FIG. 10 is a cross-sectional view of the liquid crystal display shown in FIG. 9 taken along line X-X.

Referring to FIG. 9 and FIG. 10, a plurality of gate lines 121 including a plurality of gate electrodes 124 and end portions 129, and a plurality of light blocking members 122, are formed on an insulating substrate 110. The gate lines 121 extend in the transverse direction, and the light blocking members 122 are formed in a longitudinal direction with an interval therebetween.

A gate insulating layer 140 is formed on the gate lines 121 and the light blocking members 122, and a partition 361 is formed on the gate insulating layer 140. The partition 361 includes the first partition 361a extending in the transverse direction and overlapping the light blocking members 122, and the second partition 361b expanding in the side direction from the first partition 361a and being thicker than the first partition 361a.

A plurality of semiconductor stripes 151 including a plurality of protrusions 154, a plurality of ohmic contact stripes 161 including a plurality of protrusions 163, and a plurality of ohmic contact islands 165 are formed on the gate insulating layer 140 and the partition 361.

A plurality of data lines 171 and a plurality of drain electrodes 175 are formed on the ohmic contact stripes 161, the ohmic contact islands 165, and the gate insulating layer 140.

The data lines 171 extend in the longitudinal direction to cross the gate lines 121, and overlap the first partition 361a and the light blocking members 122. The data lines 171 include a plurality of source electrodes 173 extending to the gate electrodes 124, and the source electrodes 173 are opposite the drain electrodes 175 on the protrusions 154 of the semiconductor stripes 151.

A blocking layer 130 is formed on the data lines 171 and the drain electrodes 175, and a plurality of color filters 230R, 230G, and 230B are formed in regions defined by the partitions 361 on the blocking layer 130.

A passivation layer 180 is formed on the color filters 230R, 230G, and 230B.

The passivation layer 180 and the blocking layer 130 have a plurality of contact holes 185 exposing the drain electrodes 175. The contact holes 185 are disposed on the second partitions 361b, and expose the wide portions of the drain electrodes 175.

Also, the passivation layer 180 and the blocking layer 130 have a plurality of contact holes 182 exposing the end portions 179 of the data lines 171, and the passivation layer 180, the blocking layer 130, and the gate insulating layer 140 have a plurality of contact holes 181 exposing the end portions 129 of the gate lines 121.

A light blocking member 220 is formed on the passivation layer 180. The light blocking member 220 is formed on the common electrode panel 220 in the above-described exemplary embodiment, but it is formed on the thin film transistor array panel 100 in this exemplary embodiment and covers the channel of the thin film transistor.

A plurality of pixel electrodes 191 and a plurality of contact assistants 81 and 82 are formed on the passivation layer 180 and the light blocking members 220.

The pixel electrodes 191 are connected to the drain electrodes 175 through the contact holes 185 on the second partition 361b.

The left and right ends of the pixel electrodes 191 overlap the light blocking members 122. The light blocking member 122 blocks light leakage near the end portions of the pixel electrodes 191.

The contact assistants 81 and 82 are connected with the end portions 129 of the gate lines 121 and the end portions 179 of the data lines 171 via the contact holes 181 and 182, respectively.

The common electrode panel 200 facing the thin film transistor array panel 100 will now be described.

A common electrode 270 is formed on an insulating substrate 210.

Alignment layers 11 and 21 are formed on the inner surfaces of the thin film transistor array panel 100 and the common electrode panel 200, respectively.

A liquid crystal layer 3 including a plurality of liquid crystal molecules 310 is disposed between the thin film transistor array panel 100 and the common electrode panel 200.

In the present exemplary embodiment like the above-described exemplary embodiment, the thin film transistor and the pixel electrode are connected to each other simultaneously with the formation of the storage region such that the area for forming the partition 361 may be relatively decreased to thereby prevent deterioration of the aperture ratio.

In exemplary embodiments of the present invention, the connection of the thin film transistor and the pixel electrode 191 is formed on the partition such that it may be unnecessary to form a partition to prevent the color filter from flowing into the contact hole. Accordingly, the region for forming the partition may be reduced, which may prevent deterioration of the aperture ratio.

Also, a storage capacitor is formed between the pixel electrode and the common electrode such that it may be unnecessary to form an additional storage capacitor in the display region. Therefore, the aperture ratio may be increased.

Further, the storage capacitor between the pixel electrode and the common electrode is formed on the partition and not in the display region such that it may be unnecessary to also form the partition 361 near the storage capacitor to prevent the color filter from flowing into the portion for the storage capacitor region. Accordingly, the area of the partition may be reduced, thereby preventing deterioration of the aperture ratio.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
    a first substrate;
    a gate line disposed on the first substrate, the gate line comprising a gate electrode;
    a gate insulating layer disposed on the gate line;
    a partition disposed on the gate insulating layer;
    a semiconductor disposed on the gate insulating layer, the semiconductor overlapping the gate electrode;
    a data line disposed on the semiconductor, the data line comprising a source electrode and overlapping the partition;
    a drain electrode facing the source electrode on the semiconductor, the drain electrode extending on the partition;
    a color filter disposed in a region defined by the partition;
    a pixel electrode connected to the drain electrode, the connection between the pixel electrode and the drain electrode being on the partition;
    a second substrate facing the first substrate;
    a common electrode disposed on the second substrate;
    an alignment layer disposed on at least one of the pixel electrode and the common electrode; and
    a liquid crystal layer disposed between the first substrate and the second substrate.

2. The liquid crystal display of claim 1, wherein:
    the pixel electrode and the common electrode form a storage capacitor on the partition via the alignment layer as an insulator.

3. The liquid crystal display of claim 2, wherein:
    the alignment layer is disposed on one of the pixel electrode and the common electrode, and
    the pixel electrode and the alignment layer contact each other, and the alignment layer and the common electrode contact each other.

4. The liquid crystal display of claim 2, wherein:
    the alignment layer is disposed on one of the pixel electrode and the common electrode, and
    the pixel electrode and the alignment layer, or the common electrode and the alignment layer, are spaced apart from each other by 0.1 to 0.3 μm.

5. The liquid crystal display of claim 2, wherein:
    the alignment layer comprises a first alignment layer disposed on the pixel electrode and a second alignment layer disposed on the common electrode, and
    the first alignment layer and the second alignment layer contact each other.

6. The liquid crystal display of claim 2, wherein:
the alignment layer includes a first alignment layer formed on the pixel electrode and a second alignment layer disposed on the common electrode, and
the first alignment layer and the second alignment layer are spaced apart from each other by 0.1 to 0.3 μm.

7. The liquid crystal display of claim 2, wherein:
the liquid crystal display includes a first pixel, a second pixel, and a third pixel to display different colors, and
the partition comprises:
a first partition overlapping the data line and disposed between the first pixel, the second pixel, and the third pixel, and
a second partition disposed in one of the first pixel, the second pixel, and the third pixel, the second partition being thicker than the first partition.

8. The liquid crystal display of claim 1, wherein:
the partition is a light blocking member.

9. A liquid crystal display, comprising:
a first substrate;
a plurality of gate lines disposed on the first substrate;
a gate insulating layer disposed on the gate lines;
a plurality of partitions disposed on the gate insulating layer and defining a plurality of apertures;
a plurality of data lines disposed on the partitions and insulatedly crossing the gate lines to define a plurality of pixels;
a plurality of thin film transistors connected to the gate lines and the data lines;
a plurality of color filters disposed in the apertures;
a plurality of pixel electrodes disposed over the partitions and the color filters and connected to the thin film transistors;
a second substrate facing the first substrate;
a common electrode disposed on the second substrate, the common electrode forming a liquid crystal capacitor and a storage capacitor along with the pixel electrode; and
a liquid crystal layer disposed between the first substrate and the second substrate,
wherein each pixel comprises a display region where the pixel electrode and the color filter overlap each other, and a storage region where the pixel electrode and the common electrode form the storage capacitor, and
wherein the thin film transistor and the pixel electrode are connected to each other in the storage region.

10. The liquid crystal display of claim 9, wherein
the storage region is disposed on the partition.

11. The liquid crystal display of claim 10, further comprising:
an alignment layer disposed on at least one of the pixel electrode and the common electrode,
wherein the pixel electrode and the common electrode form the storage capacitor via the alignment layer as an insulator.

12. The liquid crystal display of claim 11, wherein:
the pixel electrode and the alignment layer contact each other, and the alignment layer and the common electrode contact each other.

13. The liquid crystal display of claim 11, wherein:
the alignment layer comprises a first alignment layer disposed on the pixel electrode and a second alignment layer disposed on the common electrode, and
the first alignment layer and the second alignment layer contact each other.

14. The liquid crystal display of claim 10, wherein:
the partition comprises:
a first partition corresponding to the data line, and
a second partition protruding from the first partition, the second partition being thicker than the first partition,
wherein the storage region is disposed on the second partition.

15. The liquid crystal display of claim 14, wherein:
the liquid crystal layer of the display region is thicker than the liquid crystal layer disposed on the first partition and the second partition.

16. The liquid crystal display of claim 15, wherein:
the thickness of the liquid crystal layer of the display region is in the range of 3 to 6 μm, the thickness of the liquid crystal layer on the first partition is in the range of 0.5 to 2.5 μm, and the thickness of the liquid crystal layer on the second partition is less than 0.3 μm.

17. The liquid crystal display of claim 16, wherein:
the liquid crystal layer is not disposed on the second partition.

18. The liquid crystal display of claim 9, wherein:
the partition is a spacer.

19. The liquid crystal display of claim 9, wherein:
the partition is a light blocking member.

20. The liquid crystal display of claim 9, further comprising:
a light blocking member disposed on the thin film transistors.

21. A method for manufacturing a liquid crystal display, comprising:
forming a gate electrode on a first substrate;
forming a gate insulating layer on the gate electrode;
forming a partition on the gate insulating layer;
forming a semiconductor on the partition;
forming a source electrode and a drain electrode on the semiconductor;
forming a color filter in a region defined by the partition;
forming a pixel electrode connected to the drain electrode, the connection between the pixel electrode and the drain electrode being on the partition;
forming a common electrode on a second substrate; and
assembling the first substrate with the second substrate.

22. The method of claim 21, wherein:
forming the partition comprises:
forming a first partition and a second partition having different thicknesses.

23. The method of claim 22, wherein:
forming the color filter is executed by an inkjet printing method.

24. The method of claim 21, further comprising:
forming an insulating layer, and
forming a contact hole in a portion of the insulating layer that is on the partition before forming the pixel electrode.

* * * * *